US011340453B2

(12) United States Patent
Arndt et al.

(10) Patent No.: US 11,340,453 B2
(45) Date of Patent: May 24, 2022

(54) TESTING DEVICE FOR A HEAD-UP DISPLAY (HUD)

(71) Applicant: SAINT-GOBAIN GLASS FRANCE, Courbevoie (FR)

(72) Inventors: Martin Arndt, Aachen (DE); Michele Cappuccilli, Monschau (DE); Ninet Babajani, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 73 days.

(21) Appl. No.: 17/049,487

(22) PCT Filed: Jun. 28, 2019

(86) PCT No.: PCT/EP2019/067274
§ 371 (c)(1),
(2) Date: Oct. 21, 2020

(87) PCT Pub. No.: WO2020/043352
PCT Pub. Date: Mar. 5, 2020

(65) Prior Publication Data
US 2021/0263312 A1 Aug. 26, 2021

(30) Foreign Application Priority Data

Aug. 29, 2018 (EP) .................................... 18191436

(51) Int. Cl.
*G02B 27/01* (2006.01)
*G02B 5/10* (2006.01)
(Continued)

(52) U.S. Cl.
CPC ........... *G02B 27/0101* (2013.01); *G02B 5/10* (2013.01); *G06T 7/0004* (2013.01);
(Continued)

(58) Field of Classification Search
CPC .................. G02B 27/0101; G02B 5/10; G02B 2027/012; G02B 2027/0187;
(Continued)

(56) References Cited

U.S. PATENT DOCUMENTS

2011/0189426 A1 8/2011 Durbin et al.
2013/0249942 A1 9/2013 Green et al.
(Continued)

FOREIGN PATENT DOCUMENTS

DE 10 2014 001710 A1 8/2014
EP 3 444 584 A1 2/2019
(Continued)

OTHER PUBLICATIONS

International Search Report as issued in International Patent Application No. PCT/EP2019/067274, dated Sep. 10, 2019.
(Continued)

*Primary Examiner* — Richard T Torrente
(74) *Attorney, Agent, or Firm* — Pillsbury Winthrop Shaw Pittman LLP (57) ABSTRACT

A head-up display (HUD), includes an imaging unit, an optical element, which is suitable for deflecting the radiation of the imaging unit in the direction of a windshield and thereby irradiating an HUD region of the windshield in order to generate a virtual image, a positioning device, which is suitable for fixing the windshield in a defined arrangement relative to the optical element, and a camera unit, which is suitable for capturing the virtual image through the windshield from different eye positions, wherein the optical element is configured such that the entire virtual image lies within the depth of field range of the camera unit.

18 Claims, 3 Drawing Sheets

(51) Int. Cl.
*G06T 7/00* (2017.01)
*H04N 9/31* (2006.01)
*B60K 35/00* (2006.01)

(52) U.S. Cl.
CPC .......... *H04N 9/3194* (2013.01); *B60K 35/00* (2013.01); *B60K 2370/1529* (2019.05); *B60K 2370/166* (2019.05); *B60K 2370/167* (2019.05); *B60K 2370/178* (2019.05); *B60K 2370/95* (2019.05); *G02B 2027/012* (2013.01); *G02B 2027/0187* (2013.01); *G06T 2207/30268* (2013.01)

(58) Field of Classification Search
CPC ........ G06T 7/0004; G06T 2207/30268; H04N 9/3194; B60K 35/00; B60K 2370/1529; B60K 2370/166; B60K 2370/167; B60K 2370/178; B60K 2370/95; G01M 11/0257; G01M 11/04; G01M 99/005; G01M 99/008
See application file for complete search history.

(56) References Cited

U.S. PATENT DOCUMENTS

| | | | |
|---|---|---|---|
| 2014/0354692 A1 | 12/2014 | Ng-Thow-Hong et al. | |
| 2014/0375816 A1 | 12/2014 | Maihoefer | |
| 2016/0266391 A1* | 9/2016 | Han | G09G 3/001 |
| 2018/0149867 A1* | 5/2018 | Kremers | B32B 17/10568 |
| 2019/0068963 A1* | 2/2019 | Skudlarek | H04N 5/247 |
| 2020/0082570 A1* | 3/2020 | Wunderwald | G02B 27/62 |

FOREIGN PATENT DOCUMENTS

| | | |
|---|---|---|
| JP | 2011-209457 A | 10/2011 |
| JP | 2016-161317 A | 9/2016 |
| JP | 2017-096654 A | 6/2017 |
| WO | WO 2013/136374 A1 | 9/2013 |
| WO | WO 2014/079567 A1 | 5/2014 |
| WO | WO 2016/198678 A | 12/2016 |
| WO | WO 2017/179453 A | 10/2017 |

OTHER PUBLICATIONS

Neumann, A., "Simulation-based Measurement Technology for Testing Head-Up Displays," Jan. 2012, Retrieved from the Internet: URL:https://mediatum.ub.tum.de/doc/1079689/1079689.pdf, XP055558288, 170 pages.

Notice of Reasons for Rejection as issued in Japanese Patent Application No. 2020-571369, dated Jan. 25, 2022.

* cited by examiner

TESTING DEVICE FOR A HEAD-UP DISPLAY (HUD)

CROSS-REFERENCE TO RELATED APPLICATIONS

This application is the U.S. National Stage of PCT/EP2019/067274, filed Jun. 28, 2019, which in turn claims priority to European patent application number 18191436.7 filed Aug. 29, 2018. The content of these applications are incorporated herein by reference in their entireties.

The invention relates to a testing device for a head-up display (HUD), in particular for a contact analog HUD, a method for testing such an HUD, and the use of an optical element in such testing.

Modern automobiles are increasingly equipped with so called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the driver's field of vision, for example, the current driving speed, navigation or warning messages, which the driver can perceive without having to divert his glance from the road. Head-up displays can thus contribute significantly to an increase in traffic safety. The projection distance (distance between a virtual image and the driver) of a conventional HUD for displaying static data is typically approx. 2 m.

A more recent variant of the HUD is referred to as a contact analog HUD or an augmented reality HUD. These HUDs are distinguished by a larger HUD region (projection area on the pane) and a significantly greater projection distance of at least 5 m, typically even more than 7 m. Contact analog HUDs open up the possibility of no longer projecting only readable data statically on the pane, but, instead, of using the optical information for identification of elements of the actual environment of the vehicle—exemplary applications are the optical marking of road boundaries, the optical highlighting of pedestrians on the road side, navigational instructions directly on the road, or the marking of vehicles that have been recognised by the driver assistance system. The greater projection distance is produced by a greater optical path length of the beams inside the projector, for instance, by additional mirrors and a greater volume. Contact analog HUDs are, for example, known from DE102014001710A1, WO2014079567A1, US2013249942A1, US2014354692A1, US2014375816A1, and WO2013136374A1.

When designing an HUD, it is customary to investigate the optical quality of the image in a testing device. The windshield is irradiated with an imaging unit, generating a virtual image corresponding to the HUD image, typically in the form of a characteristic pattern of points and lines. This image is captured through the windshield with a camera unit from a plurality of possible eye positions of a driver. Using the images, the occurrence of contortions, distortions, ghost images as a result of multiple reflections, and other optical effects can then be evaluated in detail for different eye positions.

As a result of the curved geometry of conventional windshields and the associated curvature of the image field, the virtual HUD image is not arranged in a plane, but is, instead, also curved in space. This does not constitute a problem in the testing of conventional HUDs because the image has only relatively small expansion and, consequently, can be captured sharply overall with the camera unit despite the curvature. However, in the case of contact analog HUDs with their substantially more expanded image size, the image curvature can cause parts of the image to always be displayed out of focus because of the limited depth of focus of the camera unit, rendering evaluation difficult or impossible. Further imaging errors result from astigmatism since the radiation strikes the windshield at an angle relative to the optical axis.

The object of the invention is to provide an improved testing device for a head-up display (HUD), which can, in particular, also be used on contact analog HUDs.

This object is accomplished according to the invention by a testing device in accordance with claim 1. Preferred embodiments emerge from the dependent claims.

Generic testing devices comprise at least an imaging unit, a positioning device, and a camera unit. The testing device according to the invention for a head-up display (HUD) moreover includes an optical element. The imaging unit emits radiation in order to generate a virtual image after reflection on a windshield to be tested, whose positioning and expansion corresponds to the later HUD image. The windshield is, however, not irradiated directly by the imaging unit, but indirectly via the optical element. The optical element is suitable for and provided for deflecting the radiation of the imaging unit in the direction of the windshield deflecting and thereby irradiating the HUD region of the windshield in order to generate the virtual image. The positioning device is suitable for and provided for fixing the windshield in a defined arrangement relative to the optical element and the imaging unit. The windshield should be irradiated by the imaging unit in the same manner as later by the HUD projector in the vehicle, so the image generated in the testing device is a good model for the later HUD projection. The radiation of the imaging unit should thus strike the same region of the windshield with essentially the same angle of incidence and the same aperture angle as the radiation of the HUD projector does later. The camera unit is suitable for and provided for capturing the virtual image through the windshield from different eye positions. "Eye positions" refers to possible positions of the eyes of a later viewer/user of the HUD.

The optical element can reduce the curvature of the virtual image in space (image field curvature) such that the entire image can be captured in focus by the camera unit, constituting a major advantage of the present invention. For this, the optical element is implemented such that the entire virtual image lies within the depth of field range of the camera unit. More precisely, this means that the expansion of the image along the optical axis (running between the camera unit and the centre of the image) is less than or equal to the extent of the depth of field range of the camera unit such that it is possible to focus the camera unit on the image such that the entire image lies within this depth of field range and is thus displayed in focus. Strictly speaking, the image includes the superimposition of the primary image and the ghost image since both should be displayed in focus. Ideally, the primary image is arranged in a single plane on which the camera unit can be focused. A slight deviation from this ideal planarity, i.e., a slight residual curvature of the image is, however, acceptable. The degree of curvature acceptable depends on the camera used and its depth of field. In addition to the image field curvature, astigmatism can also be compensated by the optical element according to the invention.

One goal of the invention is to shorten the image expansion; otherwise, it is not possible to capture the complete image within the depth of field range of the camera. This problem occurs in particular in connection with contact analog HUDs. Consequently, in a preferred embodiment, without using the optical element, the virtual image would not lie completely within the depth of field range of the camera unit. In other words, the expansion of the image along the optical axis without using the optical element is greater than the depth of field range of the camera unit.

Another advantage of the invention consists in that the beam path through the optical element is, so to speak, kinked, as a result of which the testing device can have a significantly more space-saving design, which is advantageous, in particular, in connection with contact analog HUDs and their large projection distances.

The invention also includes a method for testing an HUD, comprising at least the following steps:
(a) Positioning a windshield with an HUD region by means of a positioning device in a defined arrangement relative to an optical element,
(b) Irradiating the optical element by an imaging unit, wherein the radiation is deflected by the optical element in the direction of the windshield and the HUD region is irradiated, with a virtual image generated thereby,
(c) Capturing the virtual image by means of a camera unit from different eye positions, wherein the optical element (13) is configured such that the entire virtual image (7) lies within the depth of field range ($\Delta d$) of the camera unit (12).

The invention is described in detail in the following, with preferred embodiments referring equally to the device and to the method.

The optical element is preferably a mirror, in particular a curved mirror. A suitable design of the curvature of the mirror makes it possible to compensate for the unwanted image field curvature of the virtual image and also any astigmatism. For example, the radius of curvature of the mirror can change starting from the centre in the direction of the edge in order to influence the positioning of the portions of the image generated by the respective mirror regions. When designing the mirror, the geometry of the pane to be tested is decisive; and the position of the camera unit must also be taken into account. The design required, in particular the curvature of the mirror, can be determined by methods customary in the art, for example, using the known Coddington equations, in particular applying so-called ray tracing methods. The optical element is particularly preferably a highly polished metal mirror, which can be manufactured with high precision. Alternatively, however, other optical elements are also conceivable, for example, lenses with a suitable curvature profile.

In a preferred embodiment, the optical element is, in particular when designed as a mirror, not rotatable, but is, instead, statically mounted. Thus, a simpler and less error-prone structure can be implemented, permitting higher measurement accuracy and faster measurement. The optical element must then be designed such that the entire eye box is illuminated simultaneously. This distinguishes the optical element according to the invention in particular from a mirror within an HUD projector, which can irradiate only a limited eye box window and must be rotated to cover the entire eye box.

The testing device according to the invention is particularly advantageously suitable for testing contact analog HUDs (so-called "augmented reality head-up displays" (AR-HUD)). These have significantly larger projection distances (distance between the image and the viewer) than conventional HUDs and significantly larger projection images. As a result, the effect of the curvature of the projection image becomes more noticeable when it is captured such that it may not be possible to capture the entire image in sharp focus since parts of the image extend outside the depth of field range of the camera unit. This effect is reduced by the device according to the invention. Conventional HUDs have projection distances of less than 3 m, whereas contact analog HUDs have projection distances of (sometimes significantly) more than 3 m. Consequently, in a particularly advantageous embodiment, the virtual image is generated with a projection distance of more than 3 m, preferably more than 4 m, particularly preferably more than 5 m.

A projection arrangement for a head-up display (HUD) comprises at least a vehicle windshield (in particular of a motor vehicle, for example, of a passenger car) and a projector. The projector irradiates a region of the windshield, where the radiation is reflected in the direction of the viewer (driver), by which means a virtual image is generated, which the viewer situated in the vehicle perceives from his viewpoint as behind the windshield. The region of the windshield which can be irradiated by the projector is referred to as the HUD region. The projector is aimed at the HUD region. The direction of irradiation of the projector can typically be varied by mirrors, in particular vertically, in order to adapt the projection to the body size of the viewer. The region in which the eyes of the viewer must be situated with a given mirror position is referred to as the eye box window. This eye box window can be shifted vertically by adjustment of the mirrors, with the entire area thus available (i.e., the overlay of all possible eye box windows) referred to as eye box. A viewer situated within the eye box can perceive the virtual image. This, of course, means that the eyes of the viewer must be situated within the eyebox not, for example, the entire body. The eye box is, so to speak, the sum of all possible positionings of the eyes of the viewer, which are typically referred to as eye positions. The beam that runs between the projector and the centre of the eye box is commonly referred to as the central beam. It is a characteristic reference beam for the design of an HUD projection arrangement.

The technical terms from the field of HUDs used here are generally known to the person skilled in the art. For a detailed presentation, reference is made to the dissertation "Simulation-Based Metrology for Testing Head-Up Displays" by Alexander Neumann at the Informatics Institute of Munich Technical University (Munich: University Library of Munich TU, 2012), in particular to chapter 2 "The Head-Up Display".

The perception of the HUD projection depends on the eye position. An HUD is usually conceptually optimised for the centre of the eye box; and sometimes, with other eye positions, contortions, stronger ghost images, or other unwanted optical effects can occur. This is to be investigated with the device according to the invention.

The HUD region of the windshield is irradiated by means of the imaging unit to generate a virtual test image. The test image is typically a pattern of points and/or lines. Such patterns can then be readily evaluated quantitatively in terms of optical criteria. The pattern can have a pre-distortion such that any distortion inevitably caused by the windshield is compensated and the pattern appears regular in the virtual image (at least in terms of the centre beam). In a preferred embodiment, the imaging unit comprises a plate and a flat light source that backlights the plate. The pattern is introduced into the plate in the form of through-openings in the manner of a perforated plate. The plate can be made, for example, of metal or plastic. Alternatively, however, the imaging unit can, for example, also be implemented as a display (screen), for example, an LED, LCD, or DLP display.

The radiation of the imaging unit strikes the optical element and is projected by it onto the HUD region of the windshield fixed in the positioning device. The positioning device is, for example, a holder into which the windshield is clamped such that its position is reproducible. The relative arrangement of the windshield, the optical element, and the imaging unit is selected such that the radiation strikes the windshield at the same angle and with the same expansion as the radiation of the HUD projector such that the test image is a realistic model for the HUD projection.

The virtual test image thus generated is captured by means of the camera unit from different eye positions. For this, a single camera movably mounted, for example, on a robot arm such that it can be moved between the different eye positions can be used. Alternatively, a plurality of cameras each associated with one eye position can be used. Movement during the test is then unnecessary and the cameras are, consequently, preferably mounted statically.

The images captured by the camera unit are then analysed using image processing programs customarily in the art. In particular, the occurrence and the intensity of ghost images, contortions, for example, rotational or trapezoidal contortions, and other optical effects can be investigated as a function of the opposition.

A windshield usually comprises an outer pane and an inner pane joined to one another via a thermoplastic intermediate layer. The windshield is intended, in a window opening of a vehicle, to separate the interior from the outside environment. In the context of the invention, "inner pane" refers to the pane facing the interior (vehicle interior). "Outer pane" refers to the pane facing the outside environment. Windshields are typically curved, with customary radii of curvature in the range from approx. 10 cm to approx. 40 m. In the HUD region, radii of curvature are typically from 2 m to 20 m. The interior-side surface of the inner pane is essentially concave; the exterior-side surface of the outer pane, convex. "Interior-side surface" refers to the surface that faces the interior of the vehicle in the installed position. "Exterior-side surface" refers to the surface that faces the outside environment in the installed position.

As in the HUD, the windshield in the testing device is irradiated starting from the inner side. The HUD projector and the imaging unit are thus arranged on the interior-side of the windshield such that its inner pane faces them. The windshield is irradiated via the interior-side surface of the inner pane.

The problem of so-called ghost images is common with HUDs. The projector is arranged in the interior of the vehicle and its radiation strikes the interior-side surface of the inner pane, where part is reflected toward the driver's eyes, creating the desired virtual image, which the driver perceives from his point of view as behind the windshield, i.e., outside. Most of the radiation passes through the windshield where part is again reflected on the exterior-side surface of the outer pane. This secondary reflection creates another HUD-image—the ghost image, which is distractingly perceived by the driver as slightly offset relative to the primary image and having lower intensity. Typical windshields are wedge-shaped such that the interior-side surface of the inner pane and the exterior-side surface of the outer pane are arranged at an angle relative to one another in order to superimpose the ghost image with the primary image or at least to reduce the distance between them such that the ghost image is less distracting. However, this compensation is often not ideal and also depends on the eye position.

The wedge shape of the windshield is usually achieved by using a wedge-like thermoplastic intermediate layer. The thickness of the intermediate layer is variable, at least in sections, in the vertical course between the upper edge and the lower edge of the windshield. Here, "in sections" means that the vertical course between the upper edge and the lower edge has at least one section in which the thickness of the intermediate layer varies depending on position, i.e., the intermediate layer has a wedge angle. The thickness of the intermediate layer is variable at least in the HUD region. However, the thickness can also vary in a plurality of sections or in the entire vertical course, for example, can increase substantially continuously from the lower edge to the upper edge. The term "vertical course" refers to the course between the upper edge and the lower edge with the direction of the course being oriented substantially perpendicular to the upper edge. Since, in windshields, the upper edge can deviate greatly from a straight line, the vertical course in the context of the invention is more precisely expressed as perpendicular to the connecting line between the corners of the upper edge. The intermediate layer has, at least in sections, a finite wedge angle, i.e., a wedge angle greater than 0°, namely, in the section in which the thickness is variable. The term "wedge angle" refers to the angle between the two surfaces of the intermediate layer. If the wedge angle is not constant, the tangents to its surface must be used for its measurement at a point. Typical wedge angles are in the range from 0.2 mrad to 1 mrad, in particular from 0.3 mrad to 0.7 mrad. The wedge angle can be constant in the vertical course, which results in a linear change in thickness of the intermediate layer, with the thickness typically and preferably becoming greater from the bottom to the top. The direction indication "from the bottom to the top" refers to the direction from the lower edge to the upper edge. However, more complex thickness profiles can be present, in which the wedge angle is linearly or non-linearly variable from the bottom to the top (in other words, is position-dependent in the vertical course).

In a contact analog HUD or augmented reality HUD, not only is information projected onto a limited region of the windshield, but elements of the outside environment are included in the display. Examples of this are the marking of a pedestrian, indication of the distance to a preceding vehicle, or the projection of navigation data directly on the roadway, for example, for marking the traffic lane to be selected. The contact analog HUD is distinguished from a conventional, static HUD in that the projection distance is greater than 3 m, preferably greater than 4 m, typically even more than 5 m. In a static HUD, the projection distance is significantly smaller, typically approx. 2 m. In the context of the invention, the "projection distance" refers to the distance between the virtual image and the viewer, i.e., as a rule, the driver's head. The projection distance is preferably at least 7 m. The projection distance is preferably at most 15 m.

In a projection arrangement of a contact analog HUD, the projection distance for all projected images is substantially constant. Even projections that the viewer is supposed to perceive subjectively at a different distance have, in reality, substantially the same projection distance. The subjective impression of a different distance is obtained by geometric optical effects.

The distance between the windshield and the virtual image is customarily referred to as "image width". Since, typically, the driver's head has a distance of roughly 1 m from the windshield, the image width is approx. 1 m less than the projection distance. Consequently, as an alternative to projection distance, image width can be used as a criterion with sufficient accuracy. Accordingly, the image width is preferably more than 2 m, particularly preferably more than 3 m, most particularly preferably more than at least 4 m, and preferably at most 14 m.

The HUD region is, in the case of a contact analog HUD, typically larger than in the case of a conventional, static HUD. In a preferred embodiment, the area of the HUD region is at least 7% of the area of the windshield, particularly preferably at least 8%. The area of the HUD region of a static HUD is typically at most 4-5% of the area of the windshield.

The inner pane and the outer pane are preferably made of glass, particularly preferably of soda lime glass, which has proved itself for window glass. However, the panes can also be made from other types of glass, for example, borosilicate or aluminosilicate glass. Alternatively, the panes can, in principle, be made of plastic, in particular polycarbonate or PMMA. The thicknesses of the outer pane and of the inner pane can, in principle, be freely selected in the context of the values customary in the art. For conventional windshields, thicknesses of the individual panes are customarily in the range of 1 mm to 5 mm, in particular 1.2 mm to 3 mm. Standard pane thicknesses are, for example, 2.1 mm or 1.6 mm. The outer pane, the inner pane, and the thermoplastic intermediate layer can be clear and colourless, but also tinted or coloured. In a preferred embodiment, the total transmittance through the composite glass is greater than 70%, in particular when the composite glass is a windshield. The term "total transmittance" is based on the process for testing the light permeability of motor vehicle windows specified by ECE-R 43, Annex 3, § 9.1.

The intermediate layer is usually formed by at least one thermoplastic film, preferably based on polyvinyl butyral (PVB), ethylene vinyl acetate (EVA), polyurethane (PU), or mixtures or copolymers or derivatives thereof, particularly preferably PVB. The thickness of the intermediate layer, measured at its thin edge in the case of a wedge film, is typically in the range from 0.2 mm to 2 mm, in particular 0.5 mm to 1 mm.

The installation angle of the windshield is typically in the range from 55° to 75° relative to the horizontal, in particular from 60° to 70°, for example about 65°.

The invention also includes a testing arrangement for an HUD, comprising the testing device according to the invention and a windshield fixed in the positioning device.

The HUD tested according to the invention is preferably used in a vehicle, particularly preferably in a motor vehicle, most particularly preferably in a passenger car.

The invention also includes the use of an optical element for deflecting the radiation of an imaging unit onto an HUD region of a windshield, whose arrangement relative to the optical element is fixed by a positioning device, wherein a virtual image is generated, which, for testing purposes, is captured through the windshield by means of a camera unit from different eye positions,
wherein the optical element is configured such that the entire virtual image lies within the depth of field range of the camera unit.

In the following, the invention is explained in detail with reference to drawings and exemplary embodiments. The drawings are schematic representations and are not true to scale. The drawings in no way restrict the invention.

They depict:
FIG. 1 a plan view of the windshield for an HUD,
FIG. 2 a cross-section through the windshield of FIG. 1 as a projection surface for an HUD,
FIG. 3 a side view through a prior art testing device for HUDs,
FIG. 4 a side view through a testing device according to the invention for HUDs,
FIG. 5 simulated exemplary images of a prior art testing device per FIG. 3 and a testing device according to the invention per FIG. 4, and
FIG. 6 a schematic illustration of the expansion of the virtual image and of the depth of field range of the camera unit.

Figure 1:
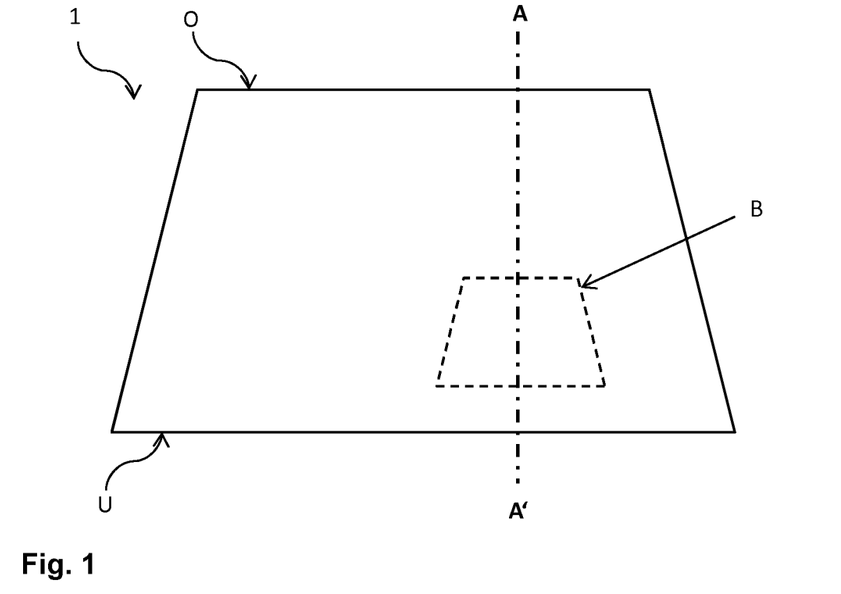

FIG. 1 depicts a plan view of a windshield 1 of an HUD projection arrangement. The windshield 1 has an upper edge O, a lower edge U, and two side edges connecting them. The upper edge O points upward, in the installation position, toward the vehicle roof (roof edge); the lower edge U, downward toward the engine compartment (engine edge). The windshield 1 has an HUD region B, which, in the installation position, can be irradiated by the HUD projector and is irradiated during operation.

Figure 2:
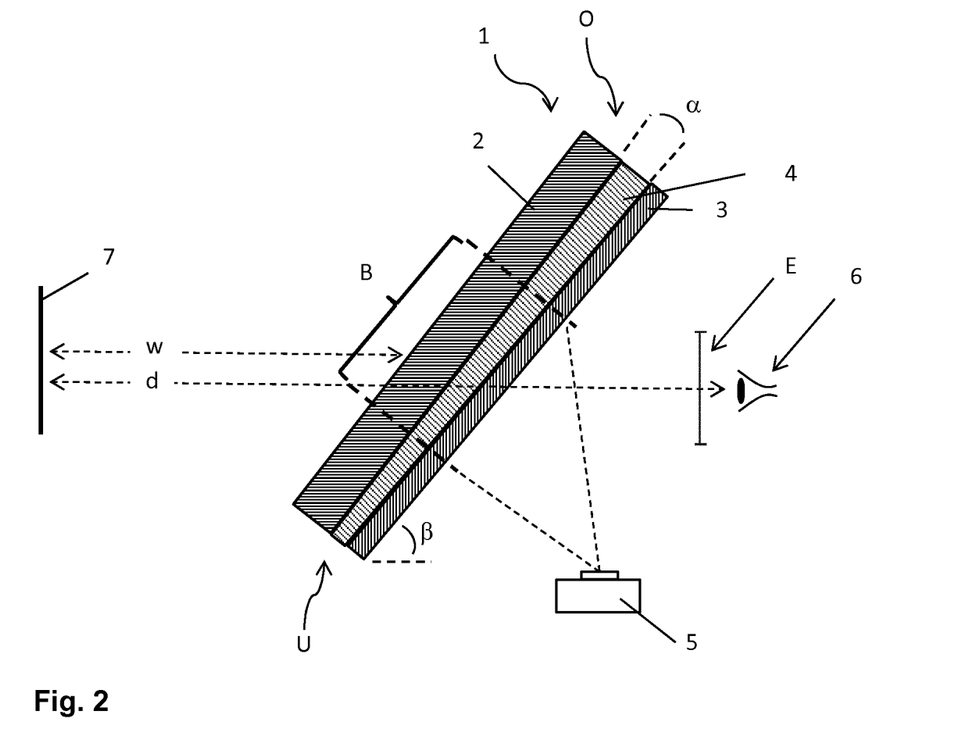

FIG. 2 depicts a cross-section through an HUD projection arrangement, comprising the windshield 1 of FIG. 1 as well as an HUD projector 5. The windshield 1 is cut by the section line A-A'. The windshield 1 comprises an outer pane 2 and an inner pane 3 joined to one another via a thermoplastic intermediate layer 4. The windshield 1 separates the vehicle interior from the outside environment, wherein, in the installation position, the outer pane 2 faces the outside environment; the inner pane 3, the vehicle interior. The installation angle β relative to the horizontal is, for example, 65°.

The outer pane 2 and the inner pane 3 are made, for example, of non-tempered soda lime glass. The outer pane 2 has, for example, a thickness of 2.1 mm; and the inner pane 3, a thickness of 1.6 mm. These panes are customary for windshields. The thickness of the intermediate layer 4 increases continuously in the vertical course from the lower edge U to the upper edge O with a substantially constant wedge angle α between the two surfaces. The intermediate layer 4 is formed from a single film made of PVB. The thickness of the intermediate layer 4 at the upper edge O is, for example, 1.0 mm and at the lower edge U, for example, 0.76 mm. By means of the wedge-shaped implementation of the intermediate layer 4, the two images that are produced by reflection of the projector image on the two surfaces of the outer pane 2 and of the inner pane 3 turned away from the intermediate layer 4 are superimposed with one another. Consequently, disruptive ghost images occur to a lesser extent.

The projector 5 is aimed at the HUD region B. Images are to be produced in this region by the projector 5. The projector image is reflected in the direction of the viewer 6 (vehicle driver) by the windshield 1. Thus, the virtual image 7 is produced, which the viewer 6 situated in the vehicle perceives behind the windshield 1 from his point of view. The distance between the viewer 6 and the virtual image 7 is referred to as the projection distance d. The distance between the windshield 1 and the virtual image 7 is referred to as the image width w.

The projection arrangement is a so-called contact analog HUD or augmented reality HUD, which is characterised by a large projection distance d of, for example, 10 m. This enables inclusion of the environment in the optical presentation, by which means, for example, the traffic lane to be selected can be projected apparently directly on the roadway as a navigation instruction for the viewer 6. In addition to the larger projection distance d, the contact analog HUD also differs from the conventional HUD by a larger HUD region B, whose area is, for example, 9% of the area of the windshield 1.

The region, within which the eyes of the viewer 6 must be situated in order to perceive the virtual image, is referred to as the eye box window. The eye box window is vertically adjustable by mirrors in the projector 5 in order to be able to adapt the HUD to viewers 6 of different body size and sitting position. The entire accessible region within which the eyebox window can be shifted is referred to as the eye box E.

With an HUD, a number of unwanted optical effects can occur. On the one hand, this involves distortions of the display, such as rotations or trapezoidal distortions. On the other, the projector radiation is reflected on both outer surfaces of the windshield 1 such that, a slightly offset ghost image is generated in addition to the primary image. The wedge angle α is intended to superimpose the primary image and the ghost image as much as possible, wherein the design of the wedge angle is usually based on the centre beam (beam between the projector 5 and the centre of the eye box 5). However, the occurrence of optical effects is strongly dependent on the eye position, i.e., the precise arrangement of the viewer within the eye box E. Consequently, the occurrence of the effects should be tested as a function of the eye position, for which purpose testing devices which constitute the subject matter of the present invention are used.

Figure 3:
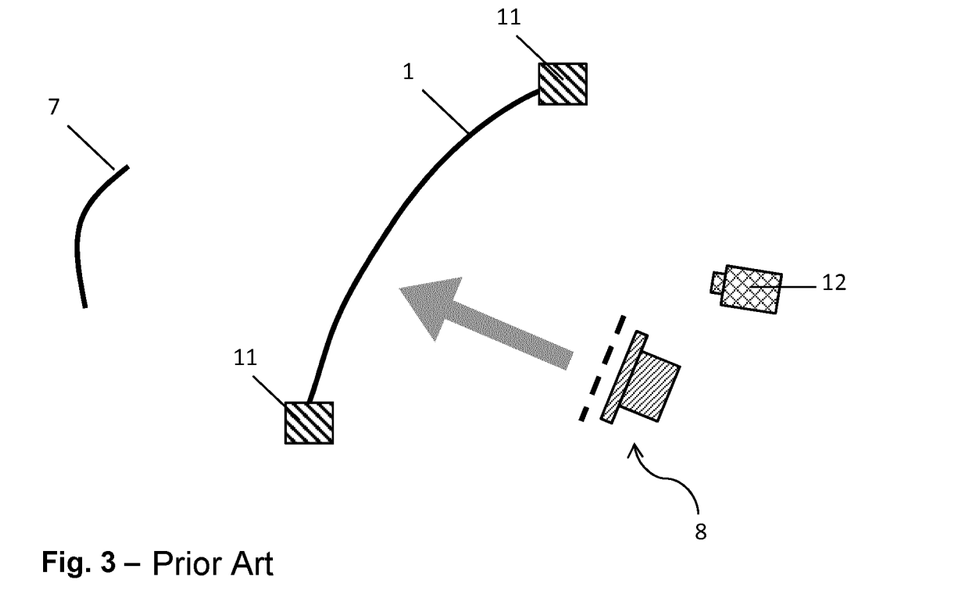

FIG. 3 depicts a generic prior art testing device for HUDs. A windshield 1 for an HUD is fixed in a positioning device 11, which defines its arrangement relative to an imaging unit 8. The imaging unit comprises a plate 9 with a characteristic pattern of perforations (holes) in the form of points and/or lines, and also a flat light source 10 that backlights the plate 9. The relative arrangement of the windshield 1 and the imaging unit 8 corresponds to the relative arrangement of the windshield 1 and the HUD projector 5 in the planned HUD set up at the point of use. The HUD region B of the windshield 1 is irradiated by the imaging unit 8, wherein a virtual image 7 of the characteristic pattern of points and/or lines is generated behind the windshield 1. The radiation is represented by a gray block arrow. The virtual image 7 is captured with a camera unit 12, for example, a camera attached to a robot arm, from different eye positions within the eye box E. The images of the camera unit 12 can then be evaluated in detail using image processing software. Thus, in particular, unwanted optical effects, such as the occurrence of ghost images or distortions, can be evaluated quantitatively and as a function of the eye position in order to draw conclusions about the quality of the HUD image.

As indicated in the figure, the virtual image 7 is not planar, but is, instead, curved in space, in particular due to the curvature of the pane. In particular in the case of relatively large images 7, as they occur with contact analog HUDs, problems can occur during capture. The camera unit 12 has a limited depth of field range such that it is sometimes impossible to capture the entire image in sharp focus. Instead, there are areas of the image 7 at each focus plane that extend outside the depth of field range and are, consequently, captured out of focus. This adversely affects the evaluation of the images.

Figure 4:
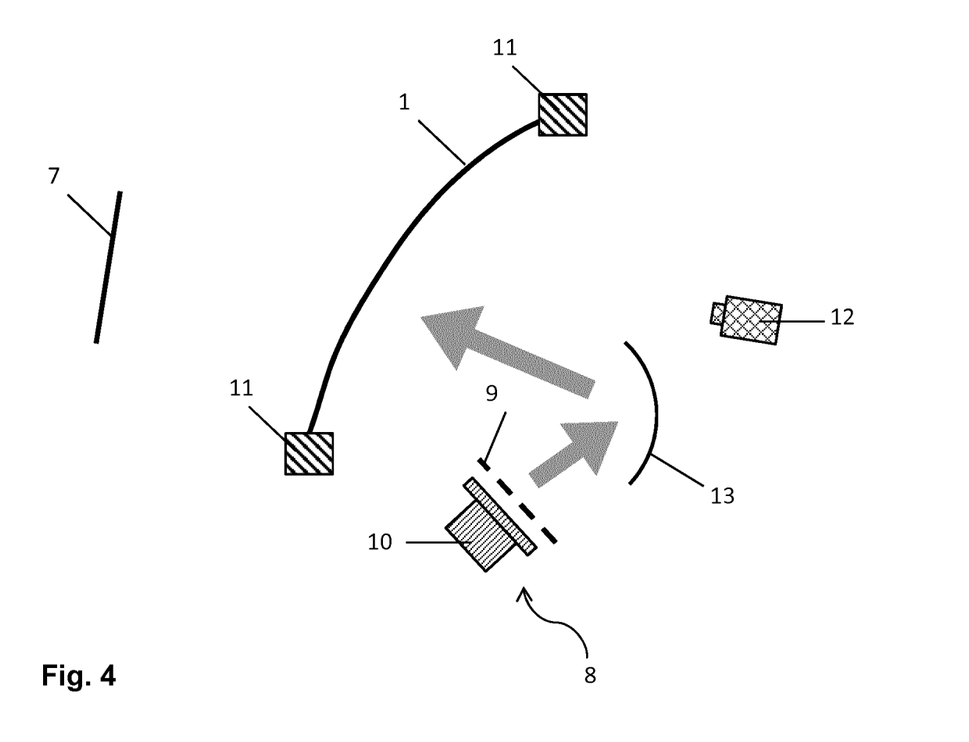

FIG. 4 depicts, on the other hand, a testing device according to the invention for HUDs. In contrast to the prior art testing device of FIG. 3, the windshield 1 is not directly irradiated by the imaging unit 8. Instead, the radiation is deflected in the direction of the windshield 1 by an optical element 13. The radiation is again represented by gray block arrows. The optical element 13 can be used to influence the virtual image 7 such that it is redesigned such that it is arranged approx. in one plane in the figure. At least the curvature of the image 7 is reduced to such an extent that its expansion along the optical axis is at most as large as the depth of field range of the camera unit 12. The camera unit 12 can then be focused such that the entire image 7 is captured in focus and problem-free evaluation is possible.

The optical element 13 is, for example, implemented as a curved mirror made of a highly polished metal plate, wherein the influence according to the invention on the curvature of the image 7 is achieved by a suitable curvature profile of the mirror, in which the radius of curvature changes suitably starting from the centre of the mirror toward the side edges.

Figure 5:
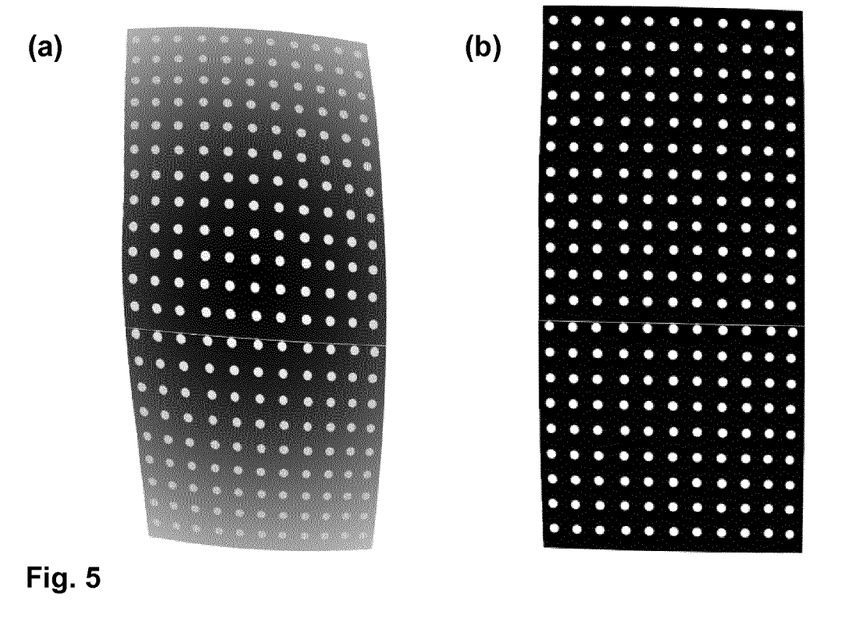

FIG. 5 depicts simulated shots of an example of the present invention and a comparative example. FIG. 5 (*a*) was based on a prior art testing device per FIG. 3, in which the windshield 1 was irradiated directly with the imaging unit 8 from the position of the HUD projector. It can be clearly seen that regions of the image are out of focus since they are not within the depth of field range of the camera unit 12. In contrast, FIG. 5 (*b*) was based on a testing device according to the invention per FIG. 4 with an aspherical mirror as the optical element 13. The expansion of the image 7 along the optical axis can be reduced by the optical element 13 such that the image 7 is completely within the depth of field range and is, accordingly, sharply focused.

In each case, the simulations assumed a backlit perforated plate with a two-dimensional pattern of holes as the imaging unit, a projection distance of 10 m, and an image size of 1600 mm×800 mm (measured in the plane of the virtual image at a distance of 10 meters from the central camera (eye point). In FIG. 5 (*a*), the distance from the perforated plate to the composite pane is 10 m. In FIG. 5 (*b*), the distance from the aspherical mirror to the composite pane is 300 mm.

Figure 6:
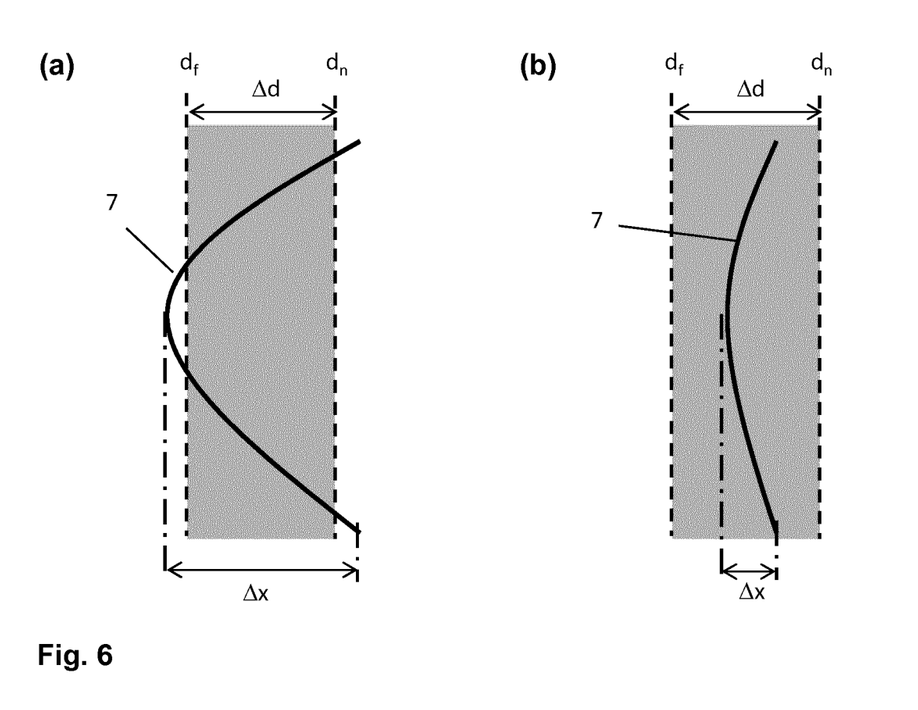

FIG. 6 illustrates the effect sought by the present invention. The camera unit 12 has a limited depth of field range Δd. At a given focus setting, this is the region between the far point $d_f$ (point farthest from the camera unit 12 that is in focus) and the near point $d_n$ (point nearest the camera unit 12 that is in focus) along the optical axis (connecting axis between the camera unit 12 and the centre of the image 12). The virtual image 7 is curved in space, primarily due to the curvature of the windshield 1. This results in an expansion Δx of the image 7 along the optical axis. If the expansion Δx is greater than the depth of field range Δd, there is no focal plane with which the entire image 7 can be displayed in focus—it always extends partially outside the depth of field range Δd (FIG. 6*a*). The optical element 13 according to the invention reduces the expansion Δx such that it is smaller than the depth of field range Δd. Now, a focal plane can be selected for which the entire image 7 is displayed in focus and can then be analysed (FIG. 6*b*). To offer the possibility of an entirely focused displayed image 7, the following must generally apply: Δx≤Δd.

Here, for the sake of simplicity, the image 7 is depicted in the form of a single line. In reality, the expansion Δx is based on the totality of the primary image and the ghost image, since both are to be displayed in sharp focus for analysis.

LIST OF REFERENCE CHARACTERS (1) windshield
(2) outer pane
(3) inner pane (4) thermoplastic intermediate layer
(5) projector
(6) viewer/vehicle driver
(7) virtual image
(8) imaging unit
(9) (metal) plate with pattern of perforations
(10) flat light source
(11) positioning device for the windshield
(12) camera unit
(13) optical element
(O) upper edge of the windshield 1
(U) lower edge of the windshield 1
(B) HUD region of the windshield 1
α wedge angle of the intermediate layer 4
β installation angle of 1 relative to the horizontal
d projection distance/distance between 6 and 7
w image distance/distance between 1 and 7
$d_n$ near point of the camera unit 12
$d_f$ far point of the camera unit 12
Δd depth of field range of the camera unit 12
Δx expansion of the image 7 along the optical axis
(E) eye box
A-A' vertical section line

The invention claimed is:

1. A testing device for a head-up display (HUD), comprising:
an imaging unit,
an optical element, which is arranged to deflect a radiation of the imaging unit in a direction of a windshield and thereby irradiate an HUD region of the windshield in order to generate a virtual image,
a positioning device, which is arranged to fix the windshield in a defined arrangement relative to the optical element, and
a camera unit, which is arranged to capture the virtual image through the windshield from different eye positions,
wherein the optical element is configured such that the entire virtual image lies within a depth of field range of the camera unit,
wherein an expansion of the image along an optical axis is less than or equal to the depth of field range of the camera unit, while the expansion of the image along the optical axis without using the optical element is greater than the depth of field range of the camera unit, and
wherein the imaging unit includes a plate with a pattern of perforations, backlit by a flat light source, or the imaging unit is a display.

2. The testing device according to claim 1, wherein the testing device is configured to generate the virtual image with a projection distance of more than 3 m.

3. The testing device according to claim 2, wherein the projection distance is more than 5 m.

4. The testing device according to claim 1, wherein the optical element is a curved mirror or a lens.

5. The testing device according to claim 4, wherein a radius of curvature of the mirror or the lens is variable from a centre toward edges of the mirror or the lens.

6. The testing device according to claim 4, wherein the curved mirror is a highly polished metal mirror.

7. The testing device according to claim 1, wherein the optical element is mounted non-rotatably.

8. The testing device according to claim 1, wherein the plate is a metal plate.

9. The testing device according to claim 1, wherein the camera unit is implemented as a single, movably mounted camera or as a plurality of statically mounted cameras.

10. A method for testing a head-up display (HUD) with the testing device according to claim 1, the method comprising:
positioning a windshield with an HUD region by a positioning device in a defined arrangement relative to an optical element,
irradiating the optical element by an imaging unit, wherein the radiation is deflected by the optical element in a direction of the windshield, and the HUD region is irradiated, with a virtual image generated thereby,
capturing the virtual image by a camera unit from different eye positions,
wherein the optical element is configured such that the entire virtual image lies within a depth of field range of the camera unit.

11. The method according to claim 10, wherein the virtual image is generated with a projection distance of more than 3 m.

12. The method according to claim 11, wherein the projection distance is more than 5 m.

13. The method according to claim 10, wherein the HUD region makes up at least 7% of an area of the windshield.

14. The method according to claim 13, wherein the HUD region makes up at least 8% of the area of the windshield.

15. The method according to claim 10, wherein the windshield comprises an outer pane and an inner pane that are joined to one another by a thermoplastic intermediate layer, wherein the intermediate layer is wedge-shaped at least in the HUD region.

16. The method according to claim 15, wherein the windshield is irradiated via the inner pane.

17. A method comprising utilizing an optical element for deflecting a radiation of an imaging unit onto an HUD region of a windshield, whose arrangement relative to the optical element is fixed by a positioning device, wherein a virtual image is generated, which is captured from different eye positions through the windshield for testing purposes by a camera unit,
wherein the optical element is configured such that the entire virtual image lies within a depth of field range of the camera unit,
wherein the method is implemented with the testing device according to claim 1.

18. The method according to claim 17, wherein the optical element is a curved mirror or a lens, and wherein a radius of curvature of the mirror or the lens is variable from a centre toward edges of the mirror or the lens.

* * * * *